United States Patent [19]

Broer et al.

[11] Patent Number: 4,733,940

[45] Date of Patent: Mar. 29, 1988

[54] LONG WAVELENGTH OPTICAL FIBER COMMUNICATION AND SENSING SYSTEMS

[75] Inventors: Matthijs M. Broer, Cokesbury; Kenneth L. Walker, New Providence, both of N.J.

[73] Assignee: American Telephone and Telegraph Company, AT&T Bell Laboratories, Murray Hill, N.J.

[21] Appl. No.: 778,065

[22] Filed: Sep. 20, 1985

[51] Int. Cl.⁴ .................................................. G02B 6/18
[52] U.S. Cl. ................................. 350/96.31; 350/96.34
[58] Field of Search ............... 350/96.29, 96.30, 96.33, 350/96.34, 96.31

[56] References Cited

U.S. PATENT DOCUMENTS 4,106,847  8/1978  Arnaud ........................ 350/96.34 X
4,406,518  9/1983  Matsumura et al. ............. 350/96.31
4,504,298  3/1985  Yokota et al. ................ 350/96.34 X

OTHER PUBLICATIONS

K. Petermann, "Theory of Microbending Loss in Monomode Fibres with Arbitrary Refractive Index Profile," *Arch. Elektron. Uebertragungstech.*, vol. 30, No. 9, 1976, pp. 337–342.
D. Marcuse, "Microdeformation Losses of Single-Mode Fibers," *Applied Optics*, vol. 23, No. 7, Apr. 1, 1984, pp. 1082–1091.
L. Jeunhomme, "Single-Mode-Fibre Design for 4 μm Band Operation," *Electronics Letters*, vol. 17, No. 16, Aug. 6, 1981, pp. 560–561.
K. C. Byron et al, "Preliminary Calculations on Dispersion Effects in Infrared Transmitting Materials," *Glass Technology*, vol. 24, No. 3, Jun. 1983, pp. 146–148.
Y. Ohishi et al, "Fabrication of Fluoride Glass Single-Mode Fibers," *Journal of Lightwave Technology*, vol. LT-2, No. 5, Oct. 1984, pp. 593–596.

*Primary Examiner*—Eugene R. LaRoche
*Assistant Examiner*—Steven J. Mottola
*Attorney, Agent, or Firm*—Bernard Tiegerman

[57] ABSTRACT

Optical communication and sensing systems are disclosed which operate at long wavelengths, i.e., wavelengths greater than about 2 μm, but less than or equal to about 11 μm. Each of these systems includes an optical fiber having material, such as a metal halide glass, which is substantially transparent to long wavelength electromagnetic radiation. These optical fibers exhibit reduced microdeformation and macrobending losses, as well as low total dispersions, at the long wavelengths. In contrast to currently held beliefs, this is achieved by using fiber designs involving relatively small relative refractive index differences, which are readily manufacturable and which avoid undesirable crystallization at core-cladding interfaces.

34 Claims, 6 Drawing Figures

LONG WAVELENGTH OPTICAL FIBER COMMUNICATION AND SENSING SYSTEMS

BACKGROUND OF THE INVENTION

1. Field of the Invention

The invention pertains generally to optical fiber communication and sensing systems.

2. Art Background

Figure 1:
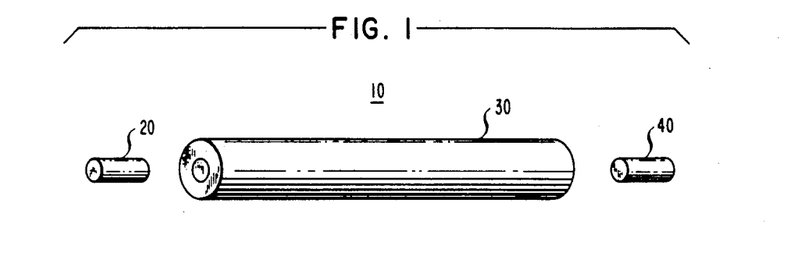
FIGS. 1 and 2 are schematic drawings depicting two embodiments of the inventive optical systems.
Figure 2:
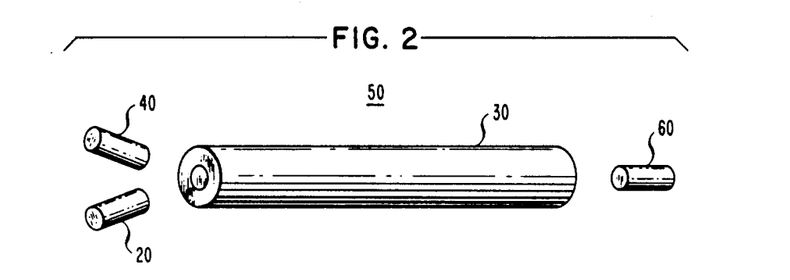

Optical fibers are now widely employed in optical communication systems, and have been proposed for use in a variety of sensing systems. For example, and as schematically depicted in FIG. 1, an optical fiber communication system 10 typically includes an optical source 20, e.g., a semiconductor laser, which communicates with an optical detector 40 through an optical fiber 30 (typically enclosed within a cable). That is, the optical fiber 30 serves to transmit at least a portion of the light, e.g., information-carrying light pulses, emitted by the optical source to the detector. By contrast, and as schematically depicted in FIG. 2, an optical fiber sensing system 50 typically includes an optical source 20 which communicates with a sensor (a transducer device) 60 through an optical fiber 30. In addition, the system 50 includes an optical detector 40 which communicates with the sensor 60 through, for example, the optical fiber 30 (as shown in FIG. 2) or through a second optical fiber. In operation, the optical fiber 30 transmits at least a portion of the light emitted by the optical source 20 to the sensor 60. At least a portion of the transmitted light is either reflected by the sensor 60 back into the optical fiber 30, or is reflected or transmitted by the sensor 60 into the second optical fiber, and thus transmitted to the optical detector 40. If an appropriate external stimulus impinges upon the sensor 60, then the sensor (a transducer device) typically alters the intensity and/or phase of the light transmitted to the detector 40. Significantly, the sensor 60 often includes a portion of one or both of the optical fibers. (Regarding these sensing systems see, e.g., Technical Digest 3rd International Conf. On Optical Fiber Sensors, San Diego, Ca. 1985.)

Two factors often play a significant role in the operation and/or design of the optical fiber systems described above. One of these is the optical loss per unit length (hereafter termed optical loss or just loss, typically measured in decibels per kilometer (dB/km)) suffered by an optical signal, e.g., an optical pulse, within the optical fiber. Typically, at present, this factor determines the distance between signal amplifiers (repeaters) along the length of the optical fiber. As is known, the optical loss is due to both intrinsic and extrinsic losses. The former is associated with the intrinsic properties of the material employed in the optical fiber. The latter denotes all other losses.

Included among the extrinsic losses are microdeformation and macrobending losses. Microdeformation losses denote the scattering losses produced by random microbends of the fiber axis (bends, i.e., deviations from perfect straightness, typically having magnitudes less than about 1 $\mu$m), as well as random fluctuations (typically smaller than about 0.1 $\mu$m) in the fiber core diameter. Macrobending losses are radiative losses produced by macroscopic bends (bends having radii or curvature typically larger than about 0.3 cm) in the fiber. (Regarding microdeformation losses see, e.g., D. Marcuse, Appl. Optics, 23 1082 (1984). Regarding macrobending losses see, e.g., L. G. Cohen, et al, IEEE J. of Quantum Electronics, Vol. QE-18, No. 10, page 1467, 1982.)

At present, silica ($SiO_2$) glass is the material which is employed in almost all optical fibers. The intrinsic loss of silica is wavelength dependent (as is the case with most other materials) and exhibits a minimum of about 0.16 dB/km at a wavelength of about 1.55 $\mu$m. Thus, to maximize repeater spacing, i.e., to achieve a repeater spacing as large as about 200 kilometers (km), silica based optical fiber systems are often operated at the minimum intrinsic loss wavelength, i.e., 1.55 $\mu$m. Significantly, the extrinsic losses associated with present-day silica fibers are much smaller than the intrinsic loss. For example, the microbending loss associated with silica glass fiber (also wavelength dependent) is estimated (by the present inventors) to be (for a single mode silica fiber) only about 5 percent of the intrinsic loss at 1.55 $\mu$m. As a consequence, microbending losses have been ignored, or have had little impact, on the design of silica based optical fiber systems.

The second factor which has significantly impacted the design of the optical fiber systems described above, is the dispersion (typically measured in units of picoseconds/kilometers-nanometer (ps/km-nm)) suffered by optical signals within an optical fiber. Dispersion limits the information flow rate, e.g., bit rate, through an optical fiber. As is known, total dispersion includes modal dispersion, material dispersion, and waveguide dispersion. Modal dispersion denotes the dispersion due to the different propagation speeds of the different modes guided by the core of an optical fiber. Material dispersion denotes the dispersion due to the wavelength dependence of the refractive index of the optical fiber material. Waveguide dispersion (which exists even in the absence of material or modal dispersion) denotes the dispersion arising from the different spatial electromagnetic power distributions assumed by different wavelength signals within the optical fiber. For example, one wavelength signal may have a spatial power distribution in which power transmission is largely confined to the cladding, while another wavelength signal may have a spatial power distribution in which power transmission is largely confined to the center of the core. The two wavelength signals will necessarily "see" different average refractive indices, and thus propagate at different average speeds. The spatial extent of electromagnetic power, and thus the waveguide dispersion, varies with the transmission wavelength, as well as with the physical and material characteristics of the fiber, e.g., the core radius, the relative refractive index difference between core and cladding, and the absolute refractive index of the fiber material. Significantly, for many fiber materials and specific fiber parameters, there are wavelength regions where the waveguide dispersion is of opposite sign (i.e., acts in opposition) to that of the material dispersion.

Modal dispersion in silica fibers has been eliminated by fabricating single mode silica fibers, i.e., fibers in which the core guides only a single mode. If, for example, the core and cladding of a fiber have different but uniform refractive indices (with the refractive index of the core being higher than that of the cladding to achieve waveguiding) then, as is known, single mode operation is achieved provided $$V = \frac{2\pi \cdot a \cdot n_{cl} \sqrt{2\Delta}}{\lambda} < 2.405. \quad (1)$$

Here, a denotes the core radius, $n_{cl}$ denotes the refractive index of the fiber cladding material, $\Delta = (n_c - n_{cl})/n_c$, where $n_c$ is the refractive index of the core, and $\lambda$ denotes the transmission wavelength. (Regarding the requirement of Equation (1) see, e.g., D. Marcuse et al, in *Optical Fiber Telecommunications* edited by S. E. Miller and A. G. Chynoweth (Academic Press, New York, 1979), Chapter 3.)

Although silica fibers exhibit zero material dispersion at a wavelength of 1.27 μm rather than at 1.55 μm (the minimum intrinsic loss wavelength), single mode silica fibers have been developed which exhibit very low (typically less than about 1 ps/km-nm) total dispersion at 1.55 μm. This has been achieved by fabricating dispersion-shifted silica fibers, i.e., silica fibers in which waveguide dispersion is used to counterbalance (negate) material dispersion at a desired wavelength, e.g., the minimum intrinsic loss wavelength. (Regarding dispersion shifting see, e.g., L. G. Cohen et al, Electr. Lett., 15,334 (1979).)

Recently, significant interest has been generated in developing single mode, dispersion shifted optical fibers based on long wavelength materials, i.e., materials transparent to light at wavelengths ranging from about 2 μm to about 11 μm. (As with silica, the zero material dispersion wavelength of these long wavelength materials differs from the minimum intrinsic loss wavelength.) Such materials include glasses such as zirconium fluoride based glasses and zinc chloride based glasses. These long wavelength materials are believed to exhibit minimum intrinsic losses (for wavelengths ranging from about 2 μm to about 11 μm) as low as, or even lower than, 0.01 dB/km. (By contrast, silica exhibits a minimum intrinsic loss of 0.16 dB/km at 1.55 μm.) Consequently, these long wavelength materials offer the possibility of producing optical communication and sensing systems having more widely spaced, and thus fewer, repeaters, i.e., repeaters spaced more than about 200 km, even more than about 400 km, and even more than about 1000 km, apart from one another.

In contrast to silica based optical fiber systems, long wavelength materials have intrinsic losses which are so low that extrinsic losses, such as microdeformation losses, are often as large as, or larger than, the intrinsic losses. As a consequence, to attain the potential benefits inherent in long wavelength materials, significant efforts have been devoted to developing optical fiber designs which reduce microdeformation losses.

A generally accepted theory for predicting microbending losses (for any material) has been developed by Klaus Petermann. (See Klaus Petermann, "Theory of Microbending Loss in Monomode Fibres with Arbitrary Refractive Index Profile," AEU Arch. Elektron Uebertragungstech. Electron Commun., 30, 337 (1976).) On the basis of this theory, and assuming constant V number, it can readily be shown that the microbending loss, $\alpha_M$, for a single mode fiber is proportional to (denoted by the symbol $\alpha$)

$$\alpha_M \alpha \frac{\lambda^2}{n^2\Delta^3}. \quad (2)$$

Equation (2) indicates that at a fixed wavelength, $\lambda$, and for a particular material, i.e., for a fixed refractive index, n the microbending loss, $\alpha_M$, increases as $\Delta$ is decreased. Equation (2) also indicates that for a fixed n and $\Delta$, $\alpha_M$ increases as transmission wavelength, $\lambda$, is increased. Thus, just to keep $\alpha_M$ constant as $\lambda$ is increased, $\Delta$ must increase with $\lambda$, i.e., $$\Delta \alpha \lambda^{\frac{2}{3}}.$$

Consequently, on the basis of the Petermann theory, it has been believed that the only way to reduce microbending losses for a given material operating at a given wavelength (longer than about 2 μm) is to employ relatively large values of $\Delta$. Moreover, it has been believed that the $\Delta$ values must increase (beyond the initially large values) as transmission wavelengths are increased, i.e., as longer wavelength materials are employed. Significantly, according to the Petermann theory, it is the very long wavelength materials (which are believed to have the lowest intrinsic losses) which must have the very largest $\Delta$ values to reduce microbending losses.

The values $\Delta$ values (expressed as a percent) employed in silica fibers are typically a few tenths of a percent (%), e.g., 0.3%. In the case of single mode, dispersion shifted (to 1.55 μm) silica fibers, $\Delta$ values of 0.50% or higher have been necessary. By contrast, the Petermann theory typically imposes the requirement that the $\Delta$ values (at wavelengths greater than about 2 μm) be as much as, or even more than, 10 times the values used in silica fibers, e.g., 3% or 5%. But, at present, such large $\Delta$ values are extremely difficult, and in some cases impossible, to achieve in long wavelength materials. Moreover, even if such large $\Delta$ values were achievable, it is known that they would result in substantial crystallization at the core-cladding interface during fiber manufacture, which significantly increases loss. Consequently, the Petermann theory has led to an impasse, i.e., according to the Petermann theory, microbending losses can only be reduced by using large $\Delta$ values which are either impossible to achieve or, if achievable, lead to crystallization and thus higher losses.

Thus, those engaged in the development of optical fiber systems based on long wavelength materials have sought, thus far without success, practical methods for reducing microbending losses, while also achieveing low dispersion.

SUMMARY OF THE INVENTION

The invention involves the finding that the Petermann theory is inapplicable to long wavelength materials and, in fact, leads to conclusions which are qualitatively wrong. For example, and contrary to the Petermann theory, it has been determined that for a fixed transmission wavelength, $\lambda$, and fixed refractive index, n losses due to microbending ($\alpha_M$) and random fluctuations in core diameter (never considered by Petermann) decrease as $\Delta$ decreases. (For purposes of comparison see the curve labeled "Petermann (microbending)" and the curves labeled "Broer-Walker (microbending)" and "Broer-Walker (core diameter fluctuations)" in FIG.4.)

Further, and contrary to the Petermann theory, it has been determined that, for a fixed n and fixed $\Delta$, losses due to microbending and core diameter fluctuations decrease with increasing $\lambda$. (Compare, for example, the curve labeled "Petermann (microbending)" against the curves labeled "Broer-Walker (microbending)" and "Broer-Walker (core diameter fluctuations)" in FIG. 5.)

On the basis of the above determinations and others, it has also been determined that microdeformation losses are reduced in single mode fibers based on long wavelength materials, having either uniform or spatially varying core and cladding refractive indices, provided $$\Delta_e < \left[ \frac{2.990 \times 10^{-4}\lambda^2 + 0.350 \times 10^{-2}\lambda - 0.573 \times 10^{-2}}{1 + 0.128\lambda} \right]^{\frac{1}{2}}.$$

Further, macrobending losses are reduced provided $$\Delta_e \geq 0.391 \times 10^{-4}\lambda^2 - 0.487 \times 10^{-3}\lambda + 0.411 \times 10^{-2}.$$

Here, $\Delta_e$ denotes the equivalent step-index, relative refractive index difference between the core and cladding, i.e., the $\Delta$ corresponding to the step index profile which is equivalent to the actual index profile within the optical fiber. (A step-index profile within an optical fiber is a refractive index profile in which there is a discontinuous, step-like increase at the core-cladding interface between a spatially uniform cladding index and a higher, but spatially uniform core index.) The $\Delta_e$'s imposed by the above restrictions are substantially lower than the corresponding $\Delta_2$'s required by the Petermann theory, and are readily produced without crystallization at core-cladding interfaces. Moreover, dispersion shifting to achieve a total dispersion less than about 10 psec/km-nm is readily achieved by, for example, empirically choosing an appropriate value for the core diameter. Thus, the impasse created by the Petermann theory has been eliminated, and the attainment of the advantages inherent in long wavelength materials is now possible.

BRIEF DESCRIPTION OF THE DRAWING

The invention is described with reference to the accompanying diagrams, where.

DETAILED DESCRIPTION

The invention involves optical fiber communication and sensing systems of the general type described above and (two embodiments of which are) depicted in FIGS. 1 and 2. However, the inventive systems are specifically designed to operate at wavelengths greater than about 2 μm but less than or equal to about 11 μm. Accordingly, to achieve transmission at these wavelengths, the optical fiber 30 (see FIGS. 1 and 2) includes long wavelength material, i.e., material which is substantially transparent to at least a portion of the electromagnetic radiations of wavelength greater than about 2 μm but less than or equal to about 11 μm. (For purposes of the invention, substantially transparent means the long wavelength material has an intrinsic optical loss less than or equal to about 0.1 dB/km.) Such long wavelength materials include, for example, a metal halide glass such as a glass containing zirconium, hafnium, cadmium, barium, zinc, lead, bismuth, aluminum, cesium, lanthanum, gadolinium, lithium, manganese, potassium, rubidium, silver, sodium, thallium, thorium, and/or yttrium halide (For purposes of the invention, metal halides denote signal or multicomponent glasses including metallic cations and halide anions.) Such long wavelength materials also include chalcogenide glasses, i.e., glasses which include sulfur, selenium, and tellurium.

Figure 3:
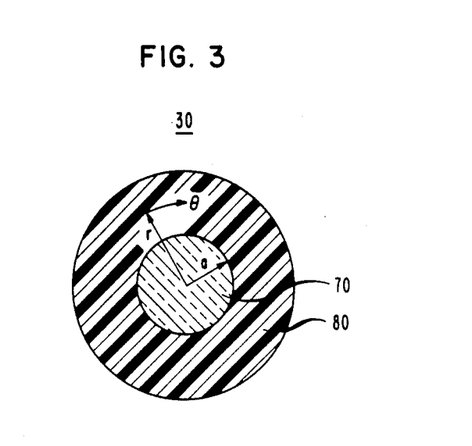
FIG. 3 is a cross-sectional view of an optical fiber useful in the inventive optical systems.

As shown in FIG. 3, the optical fiber 30 employed in the inventive optical systems includes a core 70 and a cladding 80. In cross-section, the core and cladding can have any of a variety of shapes, e.g., circular, rectangular, triangular, etc. (For purposes of illustration only, the core and cladding are depicted in FIG. 3 as having circular cross-sections, with the core having a radius a.) Further, the core 70 has a refractive index, $n_c$, which is either uniform or which varies spatially, e.g., varies with the radial and azimuthal coordinates, r, $\theta$ ($n_c = n_c(r,\theta)$). Similarly, the cladding 80 has a refractive index, $n_{cl}$, which is either uniform or which also varies spatially, e.g., $n_{cl} = n_{cl}(r,\theta)$. (A cladding having a spatially varying refractive index is achieved by, for example, including two or more layers of material, of different composition, in the cladding.) However, and regardless of the core and cladding shapes, dimensions, and refractive index profiles, these variables are chosen (in accordance with conventional design procedures) to achieve single mode operation at the operating wavelength, $\lambda$.

For purposes of comparing different single mode fiber designs, e.g., fiber designs having spatially uniform and nonuniform core and cladding refractive index profiles, it is convenient to determine the equivalent step-index, relative refractive index difference, $\Delta_e$, at the transmission wavelength, $\lambda$, for the optical fiber 30. (The $\Delta_e$ concept is conventional and is described in, for example, H. Matsumura and T. Suganuma, Appl. Opt., Vol. 10, 3151 (1980).) This determination is readily achieved by, for example, initially measuring the spot size, w, of the single mode propagated by the core 70 at the wavelength, $\lambda$. (The spot size denotes the distance between the point in the core where the electric field amplitude of the single mode is maximum to the point where it has fallen to 1/e of the maximum.) Then, the cutoff wavelength, $\lambda_c$, i.e., the wavelength at which the second mode appears, is measured. (Regarding techniques for measuring w and $\lambda_c$ see, e.g., C. A. Millar, Elec. Lett. 17, 458 (1981).) Alternatively, w and $\lambda_c$ are calculated. (Regarding techniques for calculating w and $\lambda_c$ see, e.g., G. E. Peterson et al, Bell System Technical Journal, 59 No. 7, 1175 (1980).) Once, w and $\lambda_c$ have been measured or calculated, the effective V number, $V_e$, is calculated from the relation $$V_e = 2.41 \left( \frac{\lambda_c}{\lambda} \right).$$

Then the effective core radius, $a_e$, is calculated from the relation $$\frac{w}{a_e} = 0.65 + \frac{1.619}{V_e^{1.5}} + \frac{2.879}{V_e^6}.$$

Finally, $\Delta_e$ is calculated from the relation $$\Delta_e = \frac{\lambda^2 \cdot V_e^2}{8\pi^2 \cdot n^2 \cdot a_e^2}.$$

The design of the optical fiber 30 (employed in the inventive optical systems), and particularly the corresponding value of $\Delta_e$, is significant because it permits the achievement of a long sought goal—a single mode optical fiber based on long wavelength materials which exhibits low microdeformation and macrobending losses, exhibits a total dispersion less than about 10 ps/km-nm, and is readily fabricated without crystallization at the core cladding interface. The low microdeformation and macrobending losses are, in turn, significant because they offer the possibility of achieving an optical fiber based on long wavelength materials which exhibits a total loss (the sum of intrinsic and extrinsic losses) less than about 0.1 dB/km, and even less than about 0.01 dB/km. The inventive design (discussed below) is based on determinations (by the present inventors) which are directly contradictory to the Petermann theory (for wavelengths greater than about 2 $\mu$m), i.e., determinations which indicate the Petermann theory is inapplicable to long wavelength materials.

Figure 4:
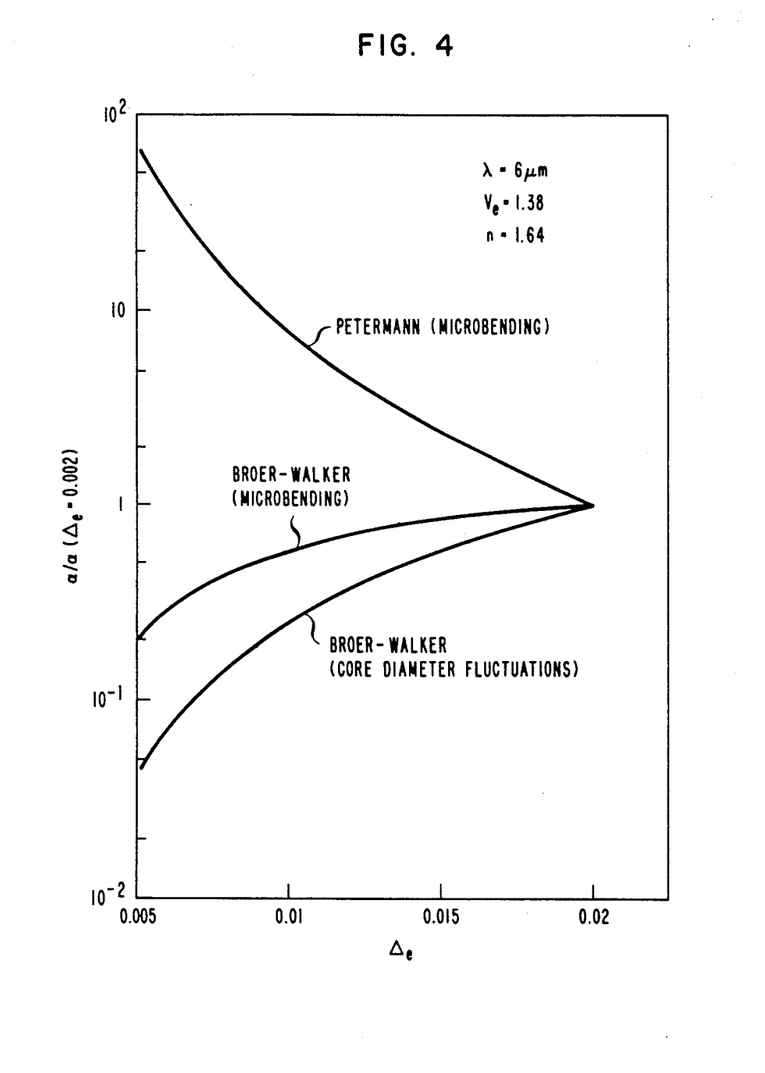
FIGS. 4 and 5 are graphs which depict, qualitatively, the determinations which underlie the design of the optical fiber employed in the inventive optical systems.
Figure 5:
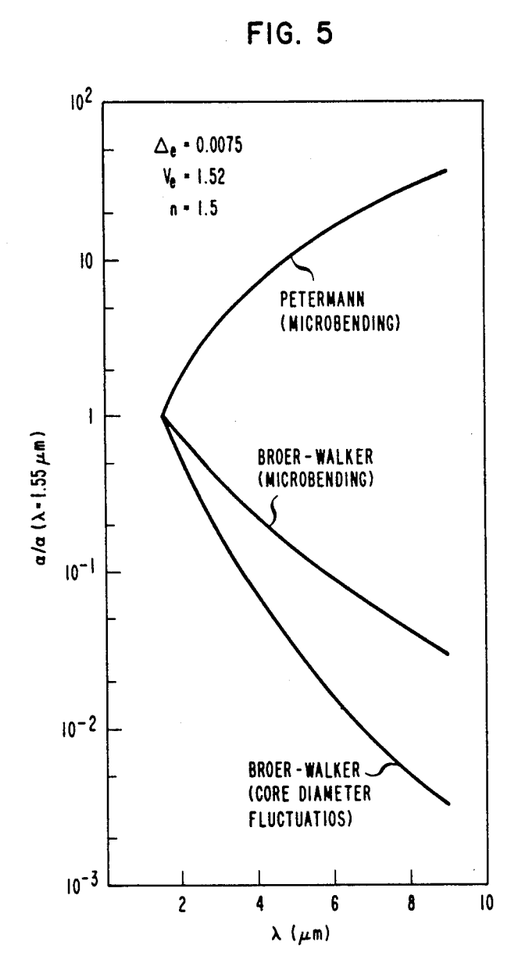

The determinations underlying the inventive optical fiber design are graphically depicted in FIGS. 4 and 5. Specifically, FIG. 4 depicts, qualitatively, the determined variation of microbending loss, and loss due to core diameter fluctuations (not considered by Petermann), with $\Delta_e$, for a single mode ($V_e=1.38$), zinc chloride ($n=1.64$) optical fiber operated at a wavelength of 6 $\mu$m (believed to be the minimum intrinsic loss wavelength for zinc chloride). (The losses have here been normalized so that the microbending loss, as well as the loss due to core diameter fluctuations, is equal to 1.0 at $\Delta_e \times 0.02$.) The curve labeled "Broer-Walker (microbending)," which is representative of the corresponding determinations, indicates that microbending loss decreases with decreasing $\Delta_e$. Similarly, the curve labeled "Broer-Walker (core diameter fluctuations)," which is also representative of the corresponding determinations, indicates that loss due to core diameter fluctuations also decreases with decreasing $\Delta_e$. By contrast, the (inapplicable) Petermann theory (see the curve labeled "Petermann (microbending)" in FIG. 4) indicates that microbending loss increases with decreasing $\Delta_e$.

FIG. 5 depicts, qualitatively, the determined variation of microbending loss, and loss due to core diameter fluctuations (not considered by Petermann), with $\lambda$, for a single mode ($V_e=1.52$) fiber having an intrinsic refractive index of $n=1.5$ and a $\Delta_e=0.0075$. (This time, the losses have been normalized so that the microbending loss, as well as the loss due to core diameter fluctuations, is equal to 1.0 at $\lambda=1.55$ $\mu$m.) The curves labeled "Broer-Walker (microbending)" and "Broer-Walker (core diameter fluctuations)," both of which are representative of the corresponding determinations, indicate that the losses due to microbending and core diameter fluctuations decrease with increasing $\lambda$. By contrast, the (inapplicable) Petermann theory (see the curve labeled "Petermann (microbending)" in FIG. 5) indicates the microbending loss increases with increasing $\lambda$.

On the basis of the above determinations, an iterative procedure has been developed (by the present inventors) for designing a single mode optical fiber 30, useful at any transmission wavelength greater than about 2 $\mu$m, but less than or equal to about 11.0 $\mu$m, which yields reduced microdeformation and macrobending losses, as well as a total dispersion less than about 10 ps/km-nm. In accordance with this procedure, conventional procedures are initially used to produce a fiber design which yields single mode operation at the operating wavelength, $\lambda$. (The refractive indices of the core and cladding are either spatially uniform or nonuniform.) However, to achieve low microdeformation losses, it has been determined that the $\Delta_e$ corresponding to this design should satisfy the requirement $$\Delta_e < \left[ \frac{2.990 \times 10^{-4}\lambda^2 + 0.350 \times 10^{-2}\lambda - 0.573 \times 10^{-2}}{1 + 0.128\lambda} \right]^{\frac{1}{2}}. \quad (4)$$

(Here, and in the following formulas, $\lambda$ is in units of $\mu$m, and $\Delta_e$ is a nondimensional, absolute number, rather than a percent.) The requirement imposed by Equation (4) constitutes a distillation of the determinations, discussed above. This requirement is necessary (but not sufficient, as further discussed below) to ensure low microdeformation losses for any long wavelength material operating at any transmission wavelength, $\lambda$ (including wavelengths other than the minimum intrinsic loss wavelength), greater than about 2 $\mu$m but less than or equal to about 11 $\mu$m.

Figure 6:
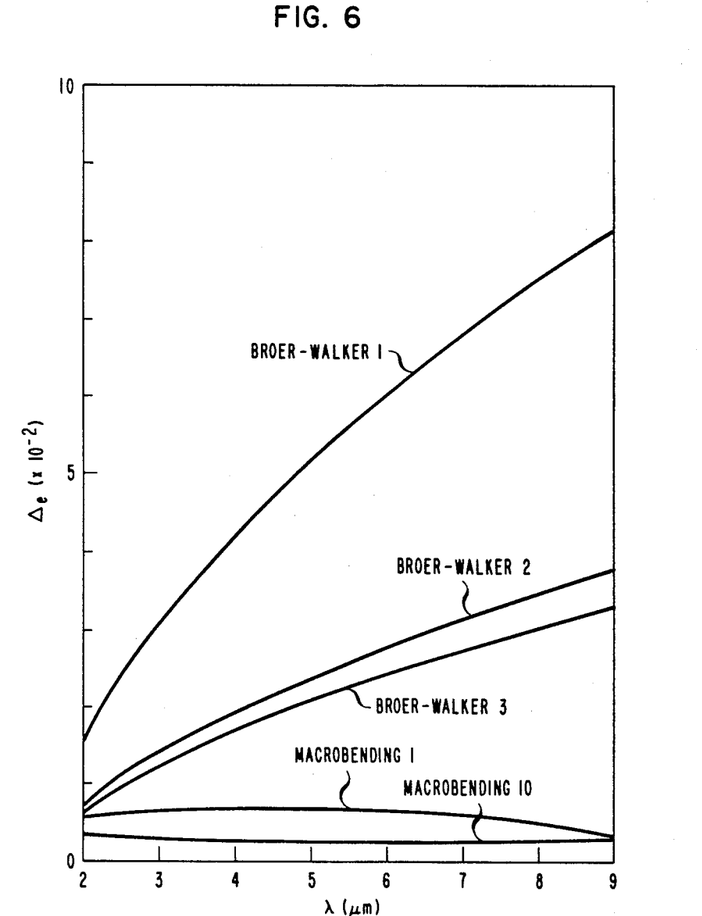
FIG. 6 includes graphs by which an optical fiber design, in accordance with the invention, is achieved.

The $\Delta_e$ values, as a function of transmission wavelength, permitted by the requirement in Equation (4), are those which fall under the curve labeled Broer-Walker 1 (B-W 1) in FIG. 6. Significantly, the $\Delta_e$ values required by the Petermann theory are those which lie above B-W 1.

Preferably, to achieve even lower microdeformation losses, the design should be such that $$\Delta_e \leq \left[ \frac{0.944 \times 10^{-4}\lambda^2 + 0.111 \times 10^{-2}\lambda - 0.181 \times 10^{-2}}{1 + 0.128\lambda} \right]^{\frac{1}{2}}. \quad (5)$$

Even more preferably, to achieve further reductions in microdeformation losses, the $\Delta_e$ value should be such that $$\Delta_e \leq \left[ \frac{0.771 \times 10^{-4}\lambda^2 + 0.090 \times 10^{-2}\lambda - 0.148 \times 10^{-2}}{1 + 0.128\lambda} \right]^{\frac{1}{2}}. \quad (6)$$

The $\Delta_e$ values permitted by the requirements in Equations (5) and (6) fall on and under, respectively, the curves labeled Broer-Walker 2 (B-W 2) and Broer-Walker 3 (B-W 3) in FIG. 6. Both B-W 2 and B-W 3 lie beneath B-W 1.

Significantly, not all $\Delta_e$ values lying beneath B-W 1 or 2 or 3 are desirable. That is, to avoid undesirably high macrobending losses, while also having the possibility of achieving a total dispersion (at the wavelength of interest) less than or equal to about 10 ps/km-nm, it has also been determined that $\Delta_e$ should satisfy the requirement that $$\Delta_e \geq 0.391 \times 10^{-4}\lambda^2 - 0.487 \times 10^{-3}\lambda + 0.411 \times 10^{-2}. \quad (7)$$

In this same vein, to avoid undesirably high macrobending losses while also having the possibility of achieving a total dispersion less than or equal to about 1 ps/km-nm, it has further been determined that $\Delta_e$ should satisfy the requirement that $$\Delta_e \geq -0.169\times 10^{-3}\lambda^2+0.154\times 10^{-2}\lambda+0.335\times 10^{-2}. \quad (8)$$

The $\Delta_e$ values permitted by Equation (7) fall on and above the curve labeled "Macrobending 10" in FIG. 6. On the other hand, the $\Delta_e$ values permitted by Equation (8) fall on and above the curve labeled "Macrobending 1" in FIG. 6.

It should be noted that the macrobends found in optical fibers based on long wavelength materials typically exhibit radii of curvature of about 15 cm, or more. The formulas given in Equations (7) and (8) are based on these typical values. In the event the macrobend radii of curvature are smaller than about 15 cm, then the $\Delta_e$ values needed to reduce macrobending losses are generally higher than the lower limits defined by the formulas in Equations (7) and (8).

To achieve low microdeformation and macrobending losses, it is necessary, but not sufficient, for the initial optical fiber design to yield a $\Delta_e$ which falls below, for example, B-W 1, but above "Macrobending 10". Further, such a low $\Delta_e$ will not necessarily ensure a total dispersion less than or equal to about 10 ps/km-nm. However, the low $\Delta_e$ value permits this low dispersion to be achieved via dispersion shifting, which is readily accomplished, for example, by altering core size, (e.g., core radius if the fiber is circular in cross-section). Significantly, all of the above goals, including low microdeformation and macrobending losses, as well as low dispersion, are attained if the dispersion shifting is accomplished by choosing a relatively large, and preferably the largest possible, core radius. That is, the core radius should be relatively large compared to other core radii which accomplish the same degree of dispersion shifting. In this regard, the closer the $\Delta_e$ value is to the "Macrobending 10" curve, the fewer the number of core sizes, e.g., core radii, available for achieving a desired degree of dispersion shifting, and vice versa. Of course, the $\Delta_e$ value corresponding to the resulting, dispersion shifted fiber should also be bounded by B-W 1 and "Macrobending 10", and should also yield single mode operation.

Surprisingly, the core radii resulting from the above procedure are generally much larger than the core radii found in single mode, dispersion shifted (to 1.55 $\mu$m) silica fibers. For example, the core radii in silica fibers are typically less than about 5 $\mu$m, while the core radii of the fibers produced in accordance with the above procedure are typically larger than about 5 $\mu$m, and even as large as 30 $\mu$m. These relatively large core radii are advantageous because, among other reasons, they reduce the difficulties associated with coupling light between fibers.

In the event the $\Delta_e$ value corresponding to the initial design is not bounded by, for example, B-W 1 and "Macrobending 10," then the initial design is altered, e.g., the refractive index profile in the core and/or cladding is changed, to achieve this goal. Then, a total dispersion less than or equal to about 10 ps/km-nm, or less than or equal to about 1 ps/km-nm, is achieved by altering core radius, while maintaining single mode operation, as discussed above.

What is claimed is:

1. A waveguide, comprising:
an optical fiber which is capable of transmitting electromagnetic radiation of wavelength, $\lambda$, greater than about 2 $\mu$m but less than or equal to about 11$\mu$m, said fiber being single mode and characterized by an equivalent step index, relative refractive index difference, $\Delta_e$, at said wavelength, $\lambda$, characterized in that
said optical fiber includes material which is substantially transparent to said electromangetic radiation of wavelength $\lambda$, said $\Delta_e$ is chosen so that $$\Delta_e < \left[\frac{2.990\times 10^{-4}\lambda^2 + 0.350\times 10^{-2}\lambda - 0.573\times 10^{-2}}{1+0.128\lambda}\right]^{\frac{1}{2}}$$

and
$\Delta_e \geq 0.391\times 10^{-4}\lambda^2 - 0.487\times 10^{-3}\lambda + 0.411\times 10^{-2}$, and said fiber is dispersion shifted so that the total dispersion suffered by said electromagnetic radiation of wavelength $\lambda$ within said fiber is less than or equal to about 10 ps/km-nm.

2. The waveguide of claim 1 wherein said $\Delta_e$ is chosen so that $$\Delta_e \leq \left[\frac{0.944\times 10^{-4}\lambda^2 + 0.111\times 10^{-2}\lambda - 0.181\times 10^{-2}}{1+0.128\lambda}\right]^{\frac{1}{2}}.$$

3. The waveguide of claim 1 wherein said $\Delta_e$ is chosen so that $$\Delta_e \leq \left[\frac{0.771\times 10^{-4}\lambda^2 + 0.090\times 10^{-2}\lambda - 0.148\times 10^{-2}}{1+0.128\lambda}\right]^{\frac{1}{2}}.$$

4. The waveguide of claim 1 wherein said $\Delta_e$ is chosen so that $$\Delta_e \geq -0.169\times 10^{-3}\lambda^2 + 0.154\times 10^{-2}\lambda + 0.335\times 10^{-2},$$

and said fiber is dispersion shifted so that the total dispersion suffered by said electromagnetic radiation of wavelength, $\lambda$ within said fiber is less than or equal to about 1 ps/km-nm 5. The waveguide of claim 1 wherein said material includes a metal halide glass.

6. The waveguide of claim 5 wherein said glass includes a zirconium halide.

7. The waveguide of claim 5 wherein said glass includes a hafnium halide.

8. The waveguide of claim 5 wherein said glass includes a cadmium halide.

9. The waveguide of claim 5 wherein said glass includes a barium halide.

10. The waveguide of claim 5 wherein said glass includes a zinc halide.

11. The waveguide of claim 5 wherein said glass includes a lead halide.

12. The waveguide of claim 5 wherein said glass includes a bismuth halide.

13. The waveguide of claim 5 wherein said glass includes an aluminum halide.

14. The waveguide of claim 5 wherein said glass includes a cesium halide.

15. The waveguide of claim 5 wherein said glass includes a lanthanum halide.

16. The waveguide of claim 5 wherein said glass includes a gadolinium halide.

17. The waveguide of claim 5 wherein said glass includes a lithium halide.

18. The waveguide of claim 5 wherein said glass includes a manganese halide.

19. The waveguide of claim 5 wherein said glass includes a potassium halide.

20. The waveguide of claim 5 wherein said glass includes a rubidium halide.

21. The waveguide of claim 5 wherein said glass includes a silver halide

22. The waveguide of claim 5 wherein said glass includes a sodium halide.

23. The waveguide of claim 5 wherein said glass includes a thallium halide.

24. The waveguide of claim 5 wherein said glass includes a thorium halide.

25. The waveguide of claim 5 wherein said glass includes a yttrium halide.

26. The waveguide of claim 1 wherein said material includes a chalcogenide glass.

27. An optical system, comprising:
a source of electromagnetic radiation, said source being capable of emitting electromagnetic radiation of wavelength, $\lambda$, greater than about 2 $\mu$m but less than or equal to about 11 $\mu$m;
a device; and
an optical fiber which transmits at least a portion of the electromagnetic radiation emitted by said source toward said device, said fiber being single mode and characterized by an equivalent, step index, relative refractive index difference, $\Delta_e$, at said wavelength, $\lambda$, characterized in that
said optical fiber includes material which is substantially transparent to said electromagnetic radiation of wavelength $\lambda$, said $\Delta_e$ is chosen so that $$\Delta_e < \left[ \frac{2.990 \times 10^{-4}\lambda^2 + 0.350 \times 10^{-2}\lambda - 0.573 \times 10^{-2}}{1 + 0.128\lambda} \right]^{\frac{1}{2}}$$

and $$\Delta_e \geq 0.391 \times 10^{-4}\lambda^2 - 0.487 \times 10^{-3}\lambda + 0.411 \times 10^{-2},$$

and said fiber is dispersion shifted so that the total dispersion suffered by said electromagnetic radiation of wavelength $\lambda$ within said fiber is less than or equal to about 10 ps/km-nm.

28. The optical system of claim 27 wherein said device includes an optical detector.

29. The optical system of claim 27 wherein said device includes a sensor.

30. The optical system of claim 27 wherein said $\Delta_e$ is chosen so that $$\Delta_e \leq \left[ \frac{0.944 \times 10^{-4}\lambda^2 + 0.111 \times 10^{-2}\lambda - 0.181 \times 10^{-2}}{1 + 0.128\lambda} \right]^{\frac{1}{2}}.$$

31. The optical system of claim 27 wherein said $\Delta_e$ is chosen so that $$\Delta_e \leq \left[ \frac{0.771 \times 10^{-4}\lambda^2 + 0.090 \times 10^{-2}\lambda - 0.148 \times 10^{-2}}{1 + 0.128\lambda} \right]^{\frac{1}{2}}.$$

32. The optical system of claim 27 wherein said $\Delta_e$ is chosen so that $$\Delta_e \geq -0.169 \times 10^{-3}\lambda^2 + 0.154 \times 10^{-2}\lambda + 0.335 \times 10^{-2},$$

and said fiber is dispersion shifted so that the total dispersion suffered by said electromagnetic radiation of wavelength, $\lambda$ within said fiber is less than or equal to about 1 ps/km-nm.

33. The optical system of claim 27 wherein said material includes a metal halide glass.

34. The optical system of claim 27 wherein said material includes a chalcogenide glass.

* * * * *

UNITED STATES PATENT AND TRADEMARK OFFICE
CERTIFICATE OF CORRECTION

PATENT NO. : 4,733,940

DATED : March 29, 1988

INVENTOR(S) : M. M. Broer, K. L. Walker

It is certified that error appears in the above-identified patent and that said Letters Patent is hereby corrected as shown below:

Column 2, Line 47, change " see']different" to --"see" different--.
Column 5, Line 27, change "$\Delta_2$'s" to --$\Delta_e$'s--.
Column 6, Line 6, change "signal" to --single--.
Column 7, Line 37, change "$\Delta_e$ x 0.02" to --$\Delta_e$ = 0.02--.

Signed and Sealed this

Thirty-first Day of July, 1990

*Attest:*

HARRY F. MANBECK, JR.

*Attesting Officer*   *Commissioner of Patents and Trademarks*